Sept. 21, 1948.  F. E. HANSEN  2,449,938

COUPLING

Filed Aug. 2, 1946

INVENTOR.
FRED E. HANSEN
BY
Kwis, Hudson, Boughton & Williams
ATTORNEYS

Patented Sept. 21, 1948

2,449,938

UNITED STATES PATENT OFFICE 2,449,938

COUPLING

Fred E. Hansen, Lakewood, Ohio

Application August 2, 1946, Serial No. 688,016

3 Claims. (Cl. 284—19)

This invention relates to improvement in couplings, more particularly couplings for pressure fluid lines.

It is known in the art to construct couplings which may be disconnected with a minimum loss of fluid from either of the two sections of the line joined by the coupling. In these devices the procedure of joining the two members of the coupling automatically opens valves in both members, and there is a short period before the coupling is sealed during which some loss of fluid may occur. In these prior devices also the connection between the joined parts of the line is either fully open or completely closed.

One of the objects of the present invention is to provide a coupling which in the closing operation is sealed before either of the valves is opened, so that loss of fluid is positively prevented.

Another object is the provision of a coupling wherein one of the valves is maintained closed while the coupling members are being connected together, and may then be opened to a greater or lesser extent for establishing partial or full flow through the joint, as circumstances may require.

Figure 1:
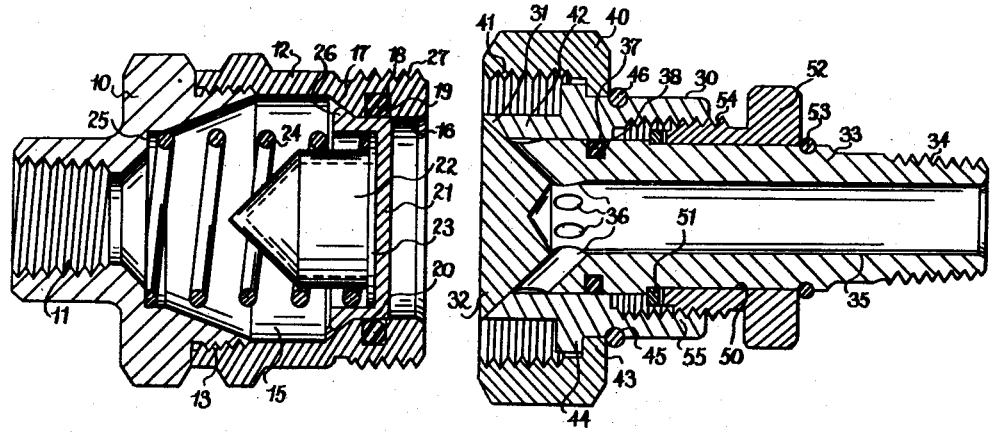

Other objects and features of novelty will appear as I proceed with the description of that embodiment of the invention which, for the purposes of the present application, I have illustrated in the accompanying drawing, in which Fig. 1 is a central longitudinal sectional view of the two members of the coupling in their disconnected state with both valves closed.

Figure 2:
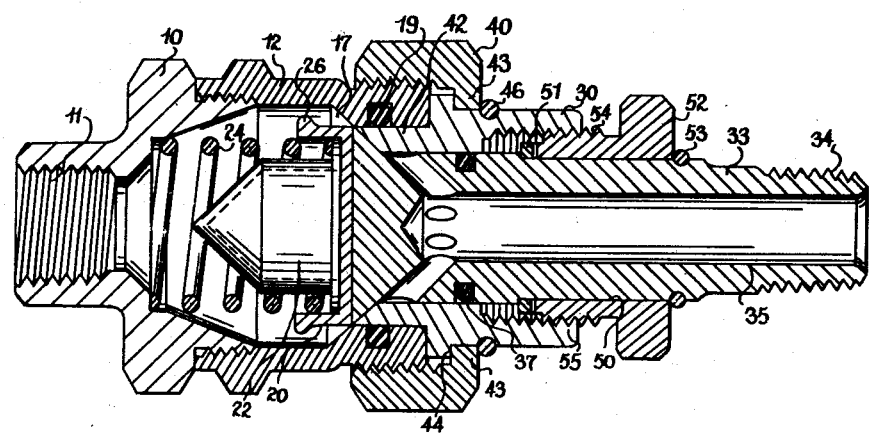
Figure 3:
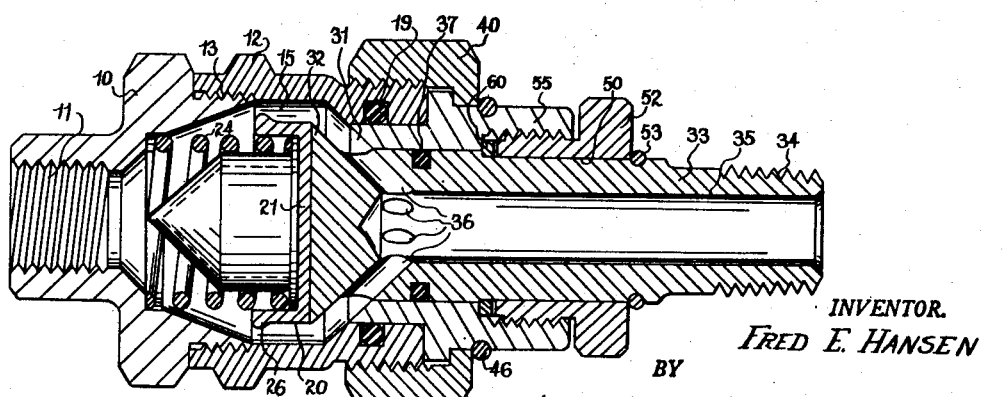

Fig. 2 is a similar view with the coupling members connected together, but the path for fluid flow closed, and Fig. 3 is a similar view, showing the manual control operated to establish maximum flow through the coupling.

In the drawing 10 is a fitting which is threaded at 11 to receive a fluid conductor, not shown. This fitting constitutes part of the female member of the coupling, the other part 12 of which is threaded to the part 10 as indicated at 13. The joint between these two parts is for convenience in manufacture and assembly and need not be disturbed except in case of repair or replacement of parts.

The internal walls of this member of the coupling define a cavity 15 which communicates with a cylindrical opening 16 in the member by way of a tapered portion 17. The wall of cylindrical opening 16 is provided with an annular groove 18 in which is mounted a gasket 19, preferably a soft rubber ring of circular cross section.

Within the cylindrical surface 16 there is mounted the cylindrical external surface 20 of a cup-shaped valve 21 that is adapted to slide upon the surface 16. Within the cup I may mount a deflector 22 having a flanged base 23 fitting the internal walls of the cup and forming an abutment for a coil spring 24, the opposite end of which seats in a recess 25 in the part 10 of the coupling member. The rim 26 of cup-shaped valve 21 is adapted to bear against the tapered surface 17 of the coupling member and thus to limit the movement of the valve toward the open end of the member. In this position of the valve the gasket 19 effectively seals the female member of the coupling. The inner end of the latter is threaded at 27.

The male member of the coupling comprises two principal parts one of which is a sleeve 30 having a tapered valve seat 31. The other consists of a correspondingly tapered valve piece 32 and a hollow valve stem 33 integral therewith, the stem being threaded at 34 on its outer end to receive a fluid conductor, not shown. The bore 35 of stem 33 is connected with the outer surface of the stem just behind the valve 32 by a plurality of drilled passages 36. The joint between the stem 33 and the sleeve 30 is sealed at all times by a soft rubber gasket 37 which is disposed within an annular groove 38 formed in the stem.

40 is a coupling nut which is threaded at 41 to engage the threads 27 on the female member. The inner end of sleeve 30 has a portion 42 of reduced diameter which is adapted to fit slidably within the surface 16 of the female member. Nut 40 at its outer end has an internally directed flange 43 that engages a shoulder 44 on the sleeve 30, whereby the reduced diameter portion of the sleeve is drawn into the female member. In order to prevent the nut 40 from slipping out of place when the coupling is disconnected, I form a groove 45 in the sleeve and snap a split ring 46 into the groove after the nut is in place.

At the inner end of a somewhat reduced diameter portion 50 of the stem 33 I mount a metal ring 51. On this same portion of the stem there is a collar 52 which is freely rotatable on the stem but is held from longitudinal movement by the ring 51 and by a split snap ring 53. This collar is threaded at 54 to engage an internally threaded part 55 of sleeve 30. By rotating the collar 52 the stem 33 can obviously be slid backward or forward in the sleeve 30 and the valve 32 can be caused to engage or disengage its seat 31.

*Operation.*—Assuming that the members of the coupling are separated and in the condition illustrated in Fig. 1, the operator in connecting them turns the nut 40 onto the threaded end 27 of the female member, which causes the sleeve 42 to be advanced gradually, carrying with it the valve 32. These parts enter the cylindrical surface 16 and presently engage the valve 21, forcing it back against the opposition of spring 24. Before the cylindrical surface of valve 23 passes beyond the gasket 19 the sleeve 42 will engage that gasket, and thus the coupling as a whole will be sealed.

By the time the nut 40 is threaded up tightly the sleeve 30 and the valve 32 will have displaced the valve 21 to the extent indicated in Fig. 2. No flow of fluid through the coupling is possible however for the valve 32 is still in engagement with its seat 31. Now the operator may grasp collar 52 and thread it inwardly from the position shown in Fig. 2, which will cause the forward end of the collar to press against metal ring 51 and move stem 33 inwardly. Valve 32 being in engagement with valve 21, both valves will move toward the left and a path for flow of fluid will be set up around valve 21, between valve 32 and its seat 31 and through passages 36 into bore 35.

The rate of flow through the coupling may be regulated as desired by turning the collar 52 through different angles until the forward or inward movement of the stem is stopped by engagement of the ring 51 with the shoulder 60 at the inner end of the threaded portion 55 of the sleeve. At this time the passages 36 will be completely uncovered by their outer ends having passed beyond the tapered valve seat 31. A path for maximum flow is thus established.

In disconnecting the coupling the reverse operations are followed, that is the operator first turns the collar 52 to draw the stem 33 backward until the valve 32 engages its seat 31 at the inner end of the sleeve, thereby sealing the male member of the coupling. The parts will then be as illustrated in Fig. 2. The operator thereupon grasps the coupling nut 40 and backs it off, thereby withdrawing the sleeve 30 and valve 32 gradually and causing the cylindrical outer surface of the valve 21 to enter the internal surface 16 of the female member. Further movement in the same direction will cause the cylindrical surface 20 of the valve to engage the gasket 19 and be sealed thereby, after which the outer surface of the reduced portion 42 of the sleeve will be withdrawn from engagement with the gasket 19, permitting the spring 24 to press the valve 21 outwardly to its position of Fig. 1.

Having thus described my invention, I claim:

1. In a coupling of the character described, a female member, a male member in two parts comprising a sleeve having a valve seat and a valve having a hollow stem slidable in said sleeve, a coupling nut rotatable on one of said members and adapted to be threadably connected with the other member for coupling or uncoupling said members, a second valve in said female member spring pressed toward closed position, said second valve being engaged by the valve part of said male member when said coupling members are operatively connected, and a collar rotatably mounted on said stem and threadably connected with said sleeve for moving the stem relative to the sleeve to open the first named valve and through it the second valve to establish flow through the connected coupling.

2. In a coupling, male and female members, a valve in each of said members, both values opening by longitudinal movement in one direction, said male member comprising a sleeve carrying a seat for one of said valves, means for coupling together said female member and said sleeve while said last named valve remains in contact with its seat, common means for sealing the valve of said female member and the joint between said sleeve and said female member, and manual means for moving said last named valve relatively to said sleeve and through it the other valve to establish flow through the coupling.

3. In a coupling of the character described, a female member having a cylindrical inner surface and having an annular groove in said surface, a resilient packing ring in said groove, a valve in said female member having a cylindrical surface adapted to engage and be sealed by said packing ring, a male member comprising a sleeve having a cylindrical surface adapted to project into said cylindrical surface of the female member, displace said valve, and engage and be sealed by said packing ring, a valve in said sleeve adapted to contact said first named valve, and manual means carried by said sleeve accessible from the outside of the coupling for moving said sleeve valve and with it said first named valve relatively to said sleeve.

FRED E. HANSEN.

REFERENCES CITED

The following references are of record in the file of this patent:

UNITED STATES PATENTS

| Number | Name | Date |
|---|---|---|
| 1,073,719 | Timmer | Sept. 23, 1913 |
| 1,384,196 | Kraft | July 12, 1921 |
| 2,092,116 | Hansen | Sept. 7, 1937 |
| 2,125,554 | Franck | Aug. 17, 1936 |
| 2,135,222 | Scheiwer | Nov. 1, 1938 |
| 2,203,922 | Paisley | June 11, 1940 |
| 2,208,286 | Berger | July 16, 1940 |
| 2,254,997 | Fisher | Sept. 2, 1941 |
| 2,310,073 | Grieg | Feb. 2, 1943 |
| 2,319,015 | Speth | May 11, 1943 |
| 2,391,022 | Main | Dec. 18, 1945 |
| 2,398,170 | Williams Foxcroft | Apr. 9, 1946 |

FOREIGN PATENTS

| Number | Country | Date |
|---|---|---|
| 524,575 | Great Britain | Aug. 9, 1940 |
| 643,096 | France | Sept. 10, 1928 |
| 709,324 | France | Aug. 5, 1931 |